(No Model.)
J. V. CAPEK.
ELECTRIC COOKING STOVE.
No. 462,532. Patented Nov. 3, 1891.
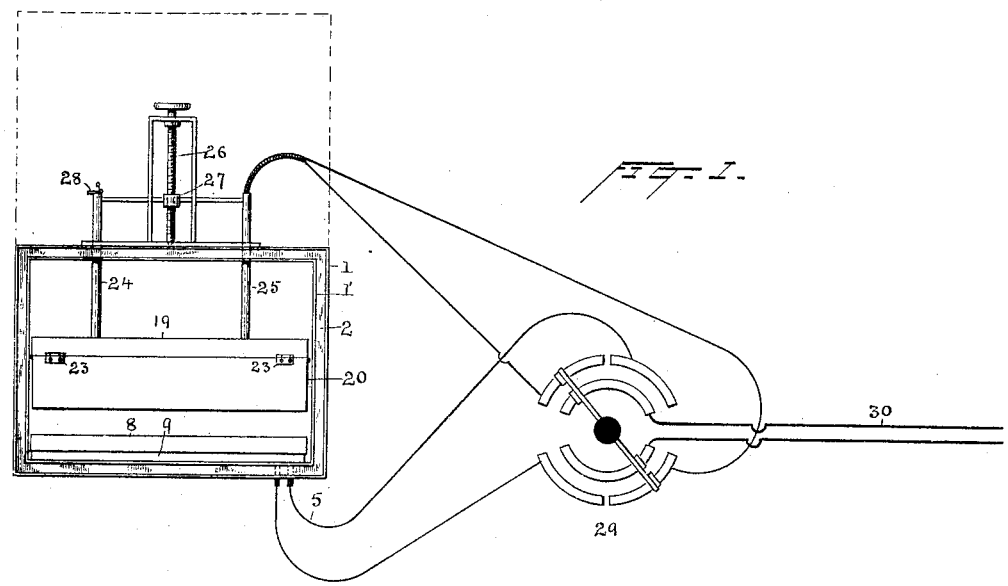
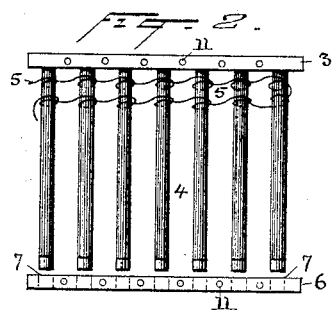
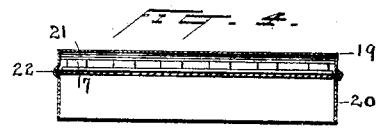
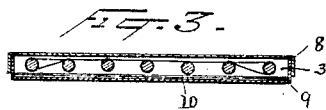
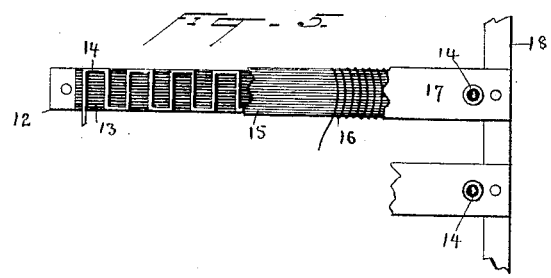
Witnesses
Norris A. Clark.
Eugene Conran
Inventor
J. V. Capek
By his Attorneys
Syer & Seely

UNITED STATES PATENT OFFICE.

JOHN V. CAPEK, OF NEW YORK, N. Y.

ELECTRIC COOKING-STOVE.

SPECIFICATION forming part of Letters Patent No. 462,532, dated November 3, 1891.

Application filed December 15, 1890. Serial No. 374,758. (No model.)

*To all whom it may concern:*

Be it known that I, JOHN V. CAPEK, a citizen of the United States, residing at New York city, in the county and State of New York, have invented a certain new and useful Improved Electric Cooking-Stove, of which the following is a specification.

My invention relates to electric heating devices, and the improvements are more especially applicable to stoves designed for cooking purposes, although of course they may be used for any other purpose for which they are adapted.

The several features and combinations which constitute my improvement will be hereinafter fully described, and specified in the several clauses of claim at the end of the specification.

In the accompanying drawings, which illustrates a stove embodying the invention, Figure 1 is a front view of the stove with a diagram of circuit connections. Fig. 2 is a view of a portion of the lower heater. Fig. 3 is a cross-section of a heater such as shown in Fig. 2 and an inclosing case. Fig. 4 is a cross-section of the upper heater, and Fig. 5 is a view showing the construction of said upper heater.

The oven or inclosing case of the stove consists of double walls 1 1', preferably of sheet metal, and which may be covered externally and internally with a poor conductor of heat, if desired. These walls are held at a suitable distance apart by any suitable means.

In the drawings a square frame 2 is shown placed between the inner and outer walls at the front of the stove. The door is removed from the stove. I preferably employ a door made double, like the walls of the stove, and sliding upward in suitable bearings at the front of the stove. The position of the door when opened is indicated in the dotted lines in Fig. 1. Within the oven I place two heaters, one at the bottom of the oven and the other above the same. The construction of the bottom heater will first be described with reference to Figs. 2 and 3. I take a comb-shaped frame consisting of the metal side piece 3 and the cross-pieces 4, which are insulated except at their ends by a material not injuriously affected by heat. The cross-pieces are insulated so that the heating-conductor may be supported thereon and not be short-circuited. The ends of the cross-pieces are left uninsulated, so that they shall be in heat-conducting contact with the side pieces 3. Around these cross-pieces I wind a heating-conductor in the manner indicated at 5 in Fig. 2, the winding being continued back and forth until the desired length of heating-conductor is obtained. The side piece 3 slightly wider than the thickness of the cross-pieces. 6 is a similar cross-piece provided with holes 7, adapted to fit over the free ends of the cross-pieces 4, thereby forming a ladder-shaped frame. This side piece may be secured to the cross-pieces by screws or in any other suitable manner.

The heater just described is placed in a case, preferably consisting of two pan-shaped parts 8 9, one fitting into the other. Between the bottom of the case and the heater is placed a layer or several layers 10 of a poor conductor of heat, such as asbestus. The upper plate or portion 8 rests directly upon side pieces 3 and 6 of the heater, and is securely connected therewith by means of screws or other devices passing into the holes 11. The heating-conductor will not be short-circuited owing to the fact that 3 and 6 extend above the cross-pieces 4. The side pieces constitute projections from or extensions of the heating-plate, since they are in direct metallic and heat-conducting contact therewith.

It will be seen from Fig. 3 that the whole heating-conductor—that is, the part of the conductor which receives current enough to raise it to a high temperature—is very near the upper or heating plate, as the wound portions of it, being cut out by contact between the convolutions, cannot be considered working parts of said heating-conductor, and that said conductor is suspended between the teeth of the comb in an inclosed air-space. The construction of the heater is such that it is very strong and can expand or contract without injury. This heater is adapted to produce a high and rapid heat.

The upper heater is preferably of different construction and is adapted to produce a slower and a more moderate heat. It is constructed as follows: A suitable number of strips 12, of heat-conducting material, are covered with insulation 13, except at their ends, and on one side of the strips thus insulated a heating-conductor of wire or foil is placed in a zigzag manner, as shown at 14. Over this conductor is placed a second layer of insulation 15, and around this insulation is wound an iron or other wire 16, the turns of the wire being preferably about a sixteenth of an inch apart. Over this winding of wire is formed a metal casting 17, of iron, brass, or other suitable metal. The heating-conductor will extend out through the casting for connection with the electrical circuit and will be suitably insulated from the casing. The iron wire 16 is for the purpose of forming a firm connection between the casting and the other parts of the heater. It will be seen that the casting will be in direct metallic connection with the strip 12 at both ends. These heating-strips are then secured to cross-strips 18, and are placed in a casing consisting of an inverted-pan-shaped section 19 and a second inverted-pan-shaped section 20. Within 19 is placed a quantity of asbestos or similar heat non-conductor 21, and below this the heating-strips 17, arranged as above described. The second inverted-pan-like section is placed immediately under the heater and in metallic connection therewith, being held in place by the bead 22. The side of the lower section 20, which faces the door of the stove, is hinged at the top, as indicated at 23, for the purpose hereinafter described. The upper heater is supported by the two tubular posts 24 25, passing through the upper wall of the stove and being provided with mechanism—such as the screw 26 and nut 27—for raising and lowering the heater. The tube 24 is provided with a valve 28 to permit the escape of steam from the stove. The other post or tube constitutes a conduit for the conductors leading from the upper heater to the switch 29.

When the switch is in the position shown in the drawings, the supply-circuit 30 is connected through the upper heater, as will be evident. When the switch-arm is moved to a vertical position, connecting the upper contacts and the lower contacts, respectively, the circuit will be closed in multiple arc through both heaters, and when the switch-arm is inclined in the opposite direction from that shown in the drawings the circuit will be closed through the lower heater only.

The apparatus described is used in the following manner: Articles to be cooked or heated are placed in the oven on the lower heater and the door closed. If a quick heat is desired, the circuit is closed through the lower heater. The upper heater, which forms a movable partition in the oven, may be moved toward the lower heater, so that the section 20 will surround and inclose the material being cooked, thereby largely economizing heat. If a higher temperature is desired, the circuit can be closed through both heaters. When the cooking is nearly completed, the circuit may be broken through the lower heater and closed only through the upper heater. When it is desired to examine the material being cooked, it may be done by raising the door and swinging the front of section 20 on its hinges.

I do not limit myself to all the details of construction and arrangement above described. The principal features of importance are the arrangement of heaters on different sides—for example, the top and bottom of the oven—one of said heaters being adjustable, whereby the distance between the heaters, and consequently the space inclosed between them, may be varied, the arrangement of the circuits described, and the construction of the heaters.

Having thus described the invention, what I claim is—

1. An electric stove having a heating-chamber, a heater supported at one side thereof, and an adjustable partition for varying the size of the heating-chamber, substantially as described.

2. An electric stove having a heating-chamber, a heater supported at one side thereof, and an adjustable heater in the form of a partition, substantially as described.

3. The combination of an inclosing case, a heater adjacent to one side thereof, a heater adjacent to an opposite side, and means for adjusting the distance between the two heaters, substantially as described.

4. The combination of an inclosing case, an electric heater adjacent to one side thereof, a heater adjacent to another side supported by posts extending through a wall of the case, and means for moving said posts and heater in and out, substantially as described.

5. The combination, with a heater, of tubular posts supporting the same connected by a cross-piece and a screw for adjusting the position of said posts, substantially as described.

6. The combination, with an electric heater in an inclosing case, of a tubular post supporting the same and forming a conduit for the conductors leading to the heater, substantially as decribed.

7. The combination, with an electric heater, of a tubular post supporting the same and having at its end a valve, substantially as decribed.

8. A heating-strip for electrical stoves, consisting of a strip of heat-conducting material, insulated, except at its ends, and supporting the heating-conductor, substantially as described.

9. A heating-strip for electrical stoves, consisting of a strip of heat-conducting material insulated and supporting the heating-conductor, and an exterior casing, substantially as described.

10. An electric heater consisting of a plate of heat-conducting material and heating-strips supporting heating-conductors supported thereon, substantially as described.

11. An electric heater consisting of a plate of heat-conducting material, projections on one side thereof, heating-strips consisting of strips of conducting material supporting the heating-conductor connected to said projections and in heat-conducting connection therewith, substantially as described.

12. An electric heater consisting of a plate of conducting material, projections on one side thereof, strips of heat-conducting material supporting the heating-conductor connected to said projections and in conducting connection therewith, and a covering of insulating and heat-resisting material over the heating-strips, substantially as described.

13. An electric stove having a heating-chamber, a heater supported at one side thereof, an adjustable heater in the form of a partition, and a casing carried by the adjustable heater and adapted to cover the lower heater, substantially as described.

14. An electric stove having a heating-chamber, a heater supported at one side thereof, an adjustable heater, a casing carried by the adjustable heater and adapted to cover the lower heater, and a door in one side of said casing, substantially as described.

15. An electric heater having several parallel insulated bars suitably held and a heating-conductor wound back and forth on said bars, the wire coiled on said bars, the coiled portions of the conductor on said bars being cut out or short-circuited, substantially as described.

16. An electric heater consisting of a ladder-shaped frame, the sides and cross-pieces being of heat-conducting material, the cross-pieces being insulated, and a heating-conductor wound on said cross-pieces, the coiled portions of the conductor being cut out or short-circuited, substantially as described.

17. An electrical heater consisting of a ladder-shaped frame, the sides and cross-pieces being of heat-conducting material, the cross-pieces being insulated, a heating-conductor wound on said cross-pieces, and a cover in contact with the side pieces, substantially as described.

18. An electrical heater consisting of a ladder-shaped frame, the sides and cross-pieces being of heat-conducting material, the cross-pieces being insulated, a heating-conductor wound on said cross-pieces, the coiled portions of the conductor being cut out or short-circuited, and an inclosing case, one side of which is separated from the heater by heat-insulating material, substantially as described.

19. The combination, with an electrical heating-conductor and its support, of an inclosing case consisting of two pan-shaped sections, one fitting into the other and one side of the case forming a heating-platform, substantially as described.

20. In an electrical stove, the combination of a fixed and movable heater, means for adjusting the position of the movable heater, and a switch for throwing either or both heaters into or out of circuit, substantially as described.

This specification signed and witnessed this 4th day of December, 1890.

JOHN V. CAPEK.

Witnesses:
CHARLES M. CATLIN,
J. A. YOUNG.